Figure 1:
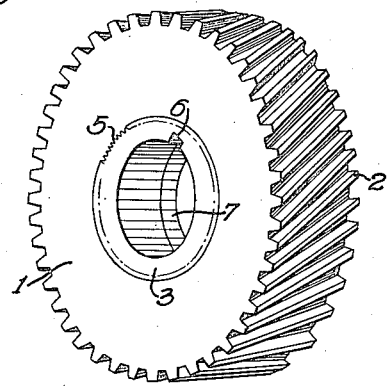

Aug. 28, 1923.

J S. KINNEY

GEAR

Filed Aug. 8, 1919

1,466,236

WITNESSES:
Geo D. Barrett
W. H. Woodman.

INVENTOR
J. Stanley Kinney.
BY
Wesley G. Carr
ATTORNEY

Patented Aug. 28, 1923.

1,466,236

UNITED STATES PATENT OFFICE.

J STANLEY KINNEY, OF WILKINSBURG, PENNSYLVANIA, ASSIGNOR TO WESTINGHOUSE ELECTRIC & MANUFACTURING COMPANY, A CORPORATION OF PENNSYLVANIA.

GEAR.

Application filed August 8, 1919. Serial No. 316,103.

*To all whom it may concern:*

Be it known that I, J STANLEY KINNEY, a citizen of the United States, and a resident of Wilkinsburg, in the county of Allegheny and State of Pennsylvania, have invented a new and useful Improvement in Gears, of which the following is a specification.

My invention relates to machine elements and, more particularly, to gear wheels of composite type comprising a working body portion of fibrous material and a hardened binder, and it has, for its primary object, the provision of a gear wheel of such material which shall be particularly adapted for use with its teeth cut at an angle to the axis of the gear.

Gear wheels of this type have been made by superimposing layers of suitable fibrous sheet material, such as a woven fabric or paper, impregnated with a binder, preferably one which may be hardened by the application of heat and pressure, such as a phenolic condensation product, and by subjecting the body thus assembled to heat and pressure to compact the material and harden the binder. As a rule, the working body portion of gears of this character are molded upon, or otherwise fixed to, a central support in the form of a hub or spider, the outer periphery of which may be knurled or otherwise roughened to insure a strong joint between the parts.

Obviously, if teeth are cut in a blank, constructed in accordance with the above process, at an angle to the axis of the gear wheel, as, for example, an angle of 45°, there is considerable end thrust exerted against the gear, during its operation, tending to force it along its shaft.

For this and other reasons it is a common practice to mount the gear in engagement with one end of a bearing for the shaft carrying the gear. The resultant metal-against-metal wear however is excessive, even if the parts are especially hardened. To obviate this, ball bearings and the like have been resorted to, but such devices add to the cost and occupy space which, in many instances, can hardly be spared.

The primary object of my present invention, therefore, resides in providing a combined gear wheel and thrust washer of composite molded material of suitable character and in mounting the working body of the gear wheel and washer thus provided upon a hub or spider in such manner that the end thrust is taken up by engagement of the thrust washer against the end of the bearing so that there is no metal-against-metal friction and resultant wear.

With these and other objects in view, my invention will be more fully described, illustrated in the drawings, in the several views of which corresponding numerals indicate like parts, and then particularly pointed out in the claims.

Figure 2:
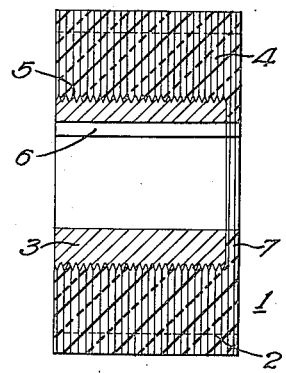
Figure 3:
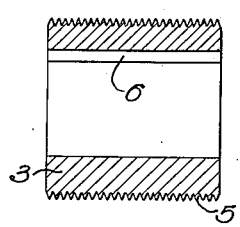
Figure 4:
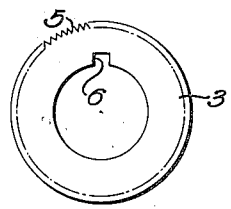

In the drawings, Fig. 1 is a perspective view of a gear wheel constructed in accordance with my invention; Fig. 2 is a diametral sectional view of the gear wheel shown in Fig. 1; Fig. 3 is a diametral sectional view of the hub or spider employed, and Fig. 4 is a side elevation thereof.

Various methods have been followed and numerous materials have been utilized in the manufacture of composite gear wheels of the general character specified and any of these methods may be followed in the particular construction of a gear wheel disclosed in this application. For example, I may impregnate a suitable fibrous sheet material, such as paper, duck, or the like, with any desired binder, such as shellac, copal or other gum resins or other shellac substitutes or with a condensation product of phenol and formaldehyde, such as the well known bakelite. The sheet material thus impregnated may be dried slightly to drive off any solvent which may have been employed or any moisture which may have been contained in the sheet material. Treated sheet may then be superimposed to form a plate of suitable thickness which may be subjected to heat and pressure to compact the material and harden the binder. Gear blanks may then be cut from this plate and molded upon a suitable hub or spider in accordance with my invention.

Preferably, however, the treated sheet material is cut into annular or segmental portions which are superimposed to form an annular gear blank of the desired size which may be assembled about the hub or spider and then subjected to heat and pressure in a mold to compact and force the material into intimate engagement with the hub and to harden the binder. Obviously, loose fibers or equivalent material may be substituted for the sheet material and molded directly upon the hub, if desired.

Referring more particularly to the drawings, I have disclosed a gear wheel constructed in accordance with my invention which may comprise a working body portion 1 formed, in its periphery, with angularly disposed teeth 2 and mounted upon a hub or spider 3. The working body portion 1 of the gear wheel may comprise a plurality of superimposed layers 4 of binder-treated fibrous sheet material, such as paper or duck, compacted and secured to the hub by heat and pressure in a mold. The hub or spider 3 may have its peripheral face knurled or otherwise roughened, as indicated at 5, to insure a strong bond between the composite material of the working body portion of the gear wheel and the hub portion thereof, and the hub may be further provided with the customary keyway 6.

My present invention contemplates the utilization of a hub of less length than the thickness of the finished gear wheel so that, while one end of the hub is flush with one side of the gear wheel, the opposite end will be inwardly spaced from the other side of the gear wheel, as clearly shown in Figs. 1 and 2 of the drawings. My invention further resides in so cutting or forming a portion of the layers of fibrous sheet material comprising the body of the gear wheel that they will overlie or abut against the inwardly spaced end of the hub or spider, as indicated at 7, to form an annular shoulder or thrust washer which may engage against the end of a bearing to provide an enduring wearing portion so that no ball bearings or the like are required.

As will be clearly apparent, a gear wheel formed with teeth cut at an angle, as, for example, an angle of 45°, when in operation, is subjected to considerable end thrust, which naturally tends to force it against an adjacent bearing. However, if the working body portion of a composite gear wheel is formed with the integral shoulder or thrust washer portion 7 to engage the bearing, it will be obvious that a durable wearing surface will be provided, as no relatively movable metal parts will engage each other.

Although I have shown a thrust washer provided at one side of the hub only, it will be obvious that the material of the working body portion of the gear wheel may be so formed as to provide thrust washers engaging against both ends of the hub or spider, if desired.

Because of the various forms of fibrous material and the numerous binders which may be utilized and also on account of the various changes in construction or design which may be resorted to to adapt my invention for use under different circumstances, it will be appreciated that no limitations are to be imposed upon my invention other than those indicated in the claims.

I claim as my invention:

1. A gear wheel comprising a metallic hub and a non-metallic working body portion fixed thereto, the working body portion having an integral annular shoulder at one end engaging against the corresponding end face of the hub.

2. A gear wheel comprising a metallic hub and a working body portion of superimposed layers of fibrous sheet material and a heat-hardened binder molded upon the hub, the working body portion projecting at one side beyond the end of the hub and having an integral annular thrust shoulder engaging against such end of the hub.

3. A gear wheel comprising a metallic hub portion and a non-metallic working body portion molded thereon, and means integral with the working body portion for engaging an end of the hub to take up end thrust exerted against the working body portion.

In testimony whereof, I have hereunto subscribed my name this 31st day of July, 1919.

J. STANLEY KINNEY.